(12) United States Patent
Matsumoto et al.

(10) Patent No.: US 7,209,169 B2
(45) Date of Patent: Apr. 24, 2007

(54) IMAGING SYSTEM USING SOLID-STATE CMOS IMAGING DEVICE

(75) Inventors: Hiroyuki Matsumoto, Takasaki (JP);
Takashi Takahashi, Takasaki (JP);
Teruaki Odaka, Mobara (JP); Masashi Nakamura, Chosei (JP); Koji Shida, Takasaki (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 784 days.

(21) Appl. No.: 10/084,466

(22) Filed: Feb. 28, 2002

(65) Prior Publication Data
US 2002/0154225 A1   Oct. 24, 2002

(30) Foreign Application Priority Data
Apr. 23, 2001   (JP)   ............................. 2001-124367
Dec. 11, 2001   (JP)   ............................. 2001-377165

(51) Int. Cl.
*H04N 3/14*     (2006.01)
*H04N 9/73*     (2006.01)

(52) U.S. Cl. .................................... 348/302; 348/226.1
(58) Field of Classification Search ...................... None
See application file for complete search history.

(56) References Cited

U.S. PATENT DOCUMENTS

| | | | |
|---|---|---|---|
| 6,271,884 B1 * | 8/2001 | Chung et al. | 348/370 |
| 6,630,953 B1 * | 10/2003 | Toyoda et al. | 348/226.1 |
| 6,710,818 B1 * | 3/2004 | Kasahara et al. | 348/226.1 |
| 6,882,363 B1 * | 4/2005 | Oda et al. | 348/226.1 |
| 6,900,837 B2 * | 5/2005 | Muramatsu et al. | 348/243 |
| 2004/0201729 A1 * | 10/2004 | Poplin et al. | 348/226.1 |

FOREIGN PATENT DOCUMENTS

| | | |
|---|---|---|
| JP | 4-135382 | 3/1990 |
| JP | 4-94273 | 8/1990 |

OTHER PUBLICATIONS

Jed Hurwitz, Stewart G. Smith, Andrew A. Murray, Peter B. Denyer, Jim Thomson, Stuart Anderson, Ed Duncan, Andrew Kinsey, Brian Paisley, Pierre-Francois Pugibet, Eric Christison, Brian Laffoley, Mark Panaghiston, Stephen Bradshaw, Julien Vittu, Remi Brechignac and Keith M. Findlater, "A Miniature Imaging Module for Mobile Applications", 2001 IEEE International Solid-State Circuits Conference, Session 6/CMOS Image Sensors with Embedded Processors, pp. 90-91.

* cited by examiner

*Primary Examiner*—Tuan Ho
*Assistant Examiner*—Luong T. Nguyen
(74) *Attorney, Agent, or Firm*—Reed Smith LLP; Stanley P. Fisher, Esq.; Juan Carlos A. Marquez, Esq.

(57) ABSTRACT

Turning on and off of the light source illuminating an object to be imaged is judged based on brightness changes in small and large areas set up in the frame and an electric charge storage time for each pixel is set up to be equal to the turning-on-and-off period of the light source or an integral multiple thereof. The charge storage time is changed over responsive to the turning-on-and-off period of the light source or the integral multiple thereof to set up a stored light amount for each pixel stepwise and difference in the stored light amount between steps is interpolated by continuous gain control of read-out signals of pixels.

2 Claims, 12 Drawing Sheets

N, M : POSITIVE INTEGER
● : CHARGE STORAGE START TIMING OF PIXEL X
○ : CHARGE STORAGE END (SIGNAL READING) TIMING OF PIXEL X
T : CHARGE STORAGE TIME

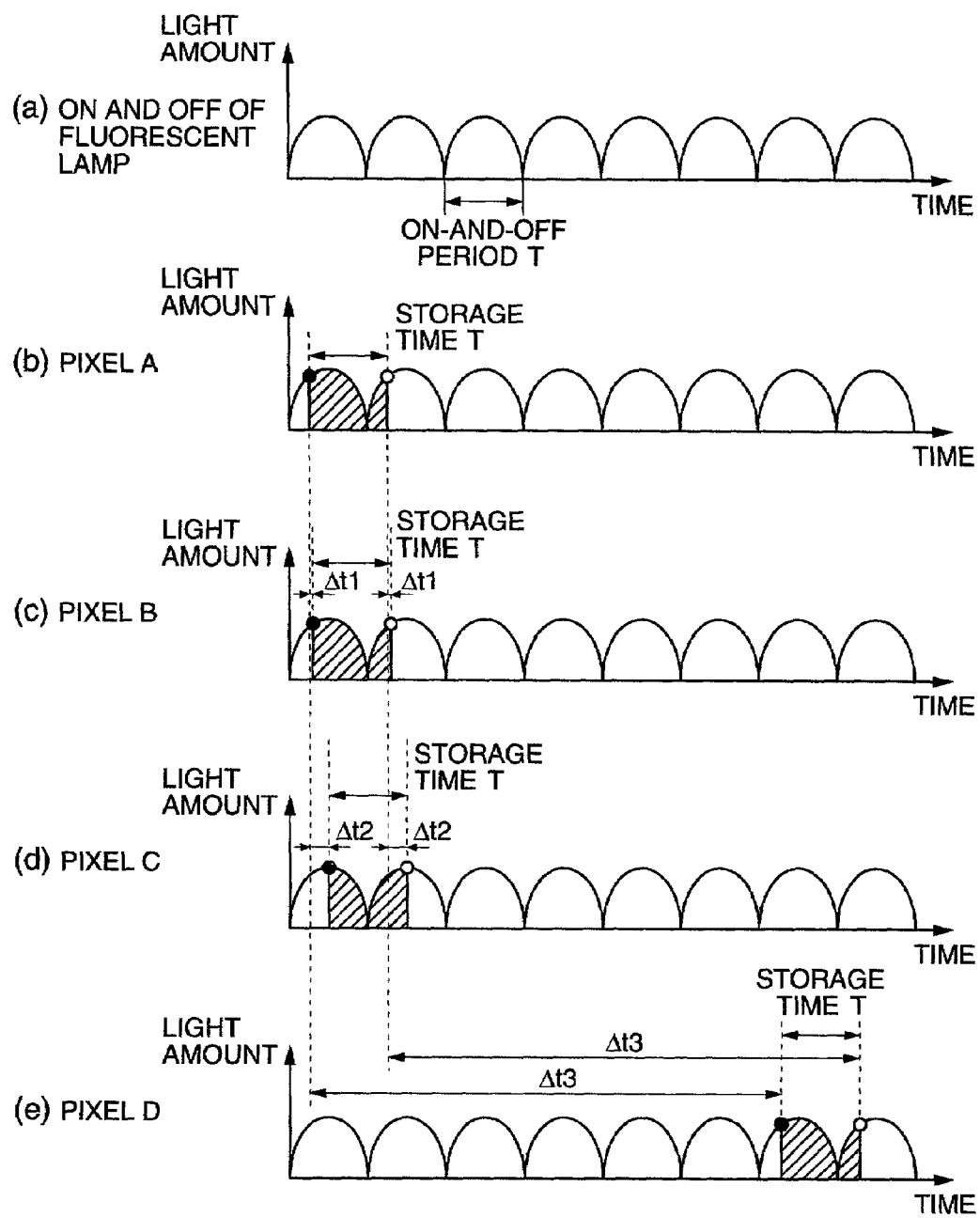

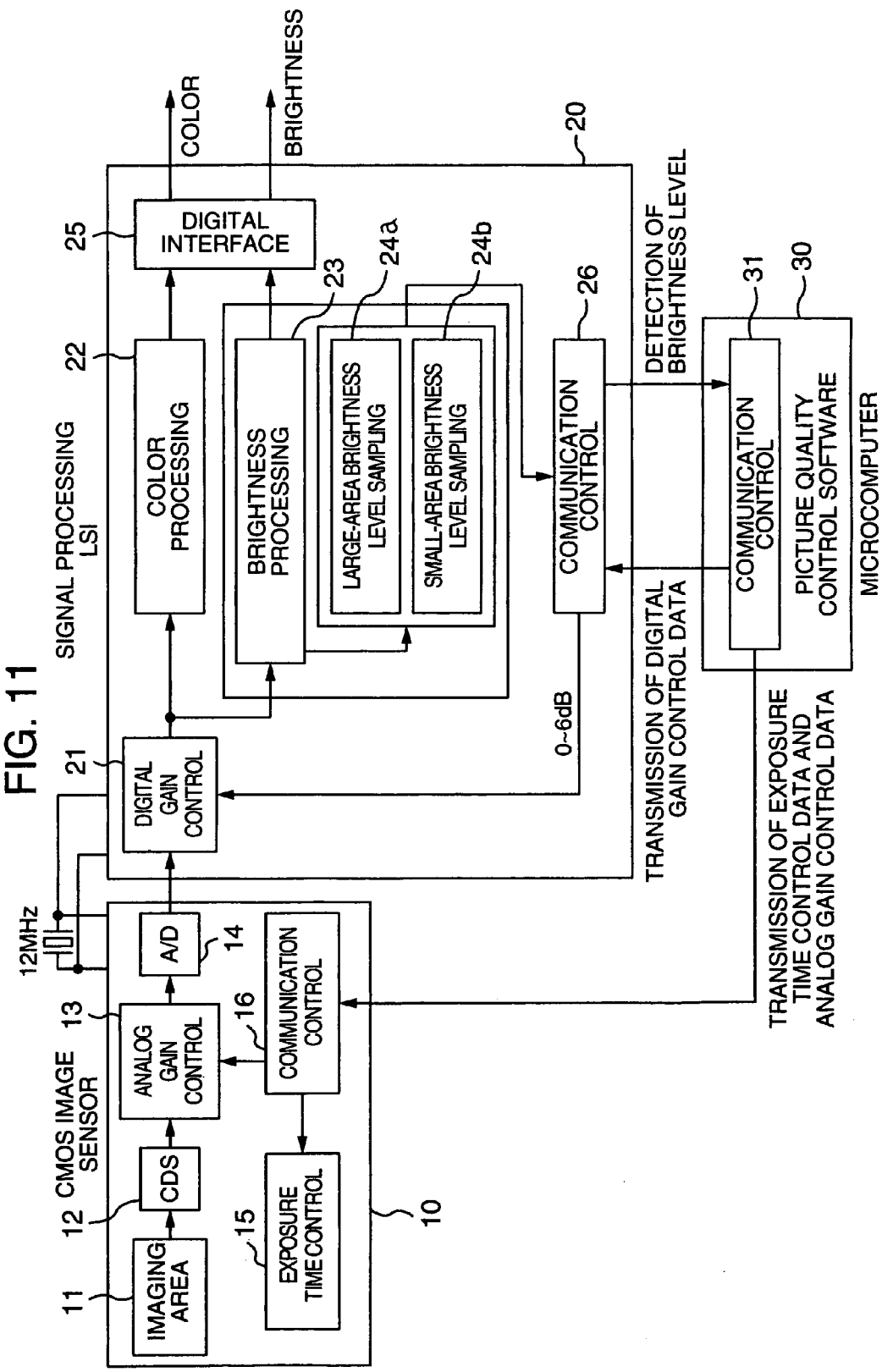

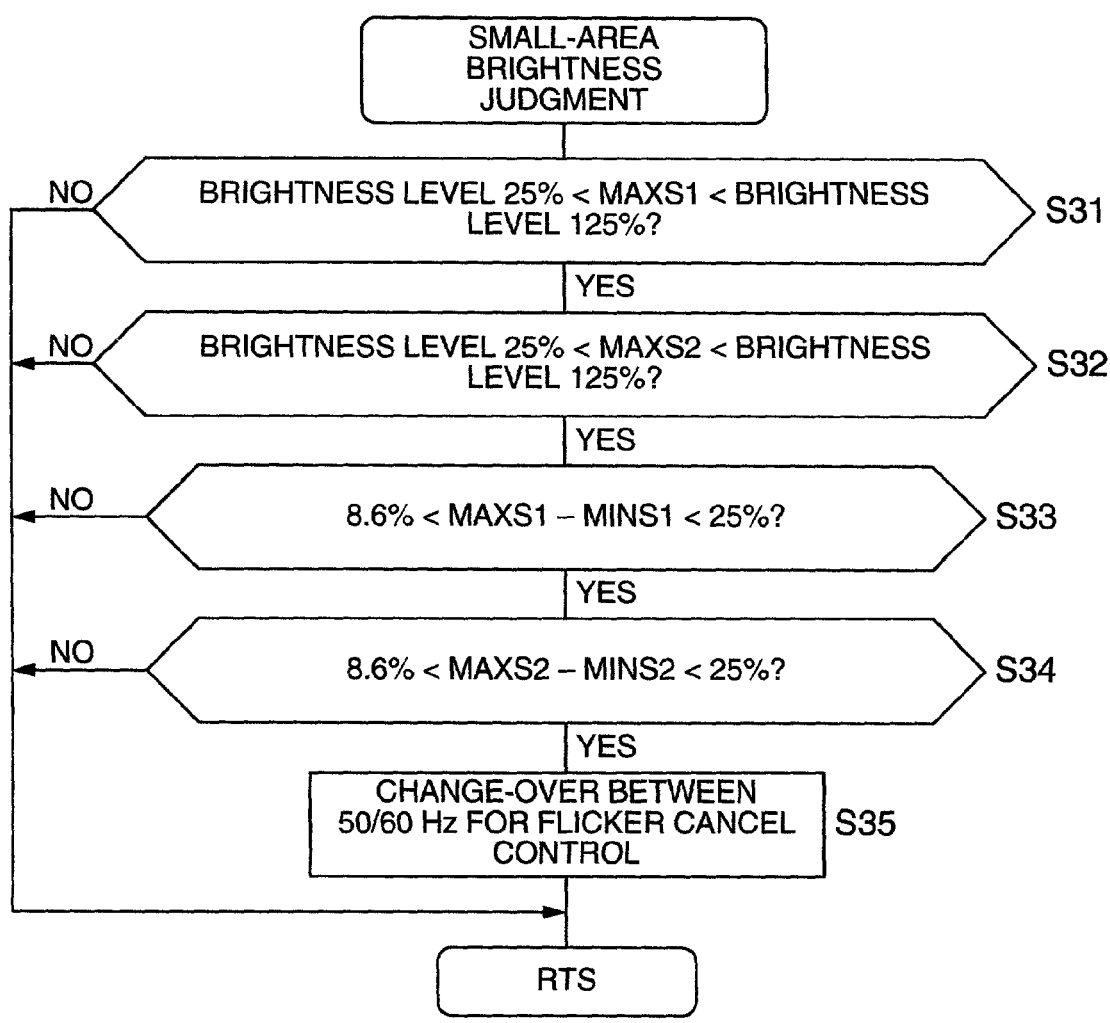

IMAGING SYSTEM USING SOLID-STATE CMOS IMAGING DEVICE

BACKGROUND OF THE INVENTION

The present invention relates to effective technique applied to an imaging system using a solid-state CMOS imaging device and more particularly to effective technique utilized to cancel flicker of a fluorescent lamp in a camera system including automatic iris adjustment function for controlling brightness of an imaged picture in accordance with photographic surroundings.

As an imaging device for a video camera or an electronic still camera, there are a solid-state CCD imaging device and a solid-state CMOS imaging device. The solid-state CMOS imaging device has merits that power consumption thereof is smaller as compared with the solid-state CCD imaging device and it is suitable for compactness and lightness in weight of a video camera and a digital camera. In the solid-state CCD imaging device, electric charges photoelectrically converted and stored for each pixel are transferred to a CCD for transfer simultaneously in parallel at the same timing for all pixels and then transferred in series within the CCD to be outputted, while it is necessary to produce a high potential difference in order to enhance the charge transfer efficiency in the CCD. Consequently, the power consumption thereof is increased.

On the other hand, in the solid-state CMOS imaging device, electric charges photoelectrically converted and stored for each pixel are converted into voltages for respective pixel to be amplified and the amplified voltage for each pixel is selected by a matrix selection circuit successively to be outputted. With such a system, the device can be operated only by a single power supply of about +3.3 volts, for example, and the power consumption thereof can be reduced to one over several as compared with the CCD type. Further, since the solid-state CMOS imaging device can utilize the CMOS process to be fabricated, peripheral circuits such as A-D converters and amplifiers are also apt to be integrated together with the device.

With the above advantages, in recent years, a camera system using the solid-state CMOS imaging device is being used in an application having a particularly higher demand for compactness and lightness in weight such as, for example, a portable data terminal. The solid-state CMOS imaging device is also being used even in a video camera system of various systems including the national television system committee (NTSC) system. In response to such tendency, the solid-state CMOS imaging device with electronic shutter function which includes integrated peripheral circuits such as A-D converters and amplifiers and can set up an electric charge storage time for each pixel externally in each frame is being offered to the market.

When the camera system using the solid-state CMOS imaging device is used under the lighting of a fluorescent lamp in a home or an office, light and dark spots (or difference in brightness) in the form of belt are produced in a frame (picture) of an imaged picture. The light and dark spots are a phenomenon caused by beat interference between a charge storage timing of the solid-state CMOS imaging device and a turning-on-and-off period of a fluorescent lamp and is flicker of the fluorescent lamp of a kind.

The flicker due to the fluorescent lamp is also produced in the camera system using the solid-state CCD imaging device, although since electric charges for all pixels are stored at the same timing in the case of the solid-state CCD imaging device, influence due to the flicker of the fluorescent lamp appears as variation in light and shade (or variation in brightness) among frames and the light and dark spots are not produced in a frame. There is provided a technique for correcting variation in light and shade among frames in the solid-state CCD imaging device by means of, for example, automatic gain control (AGC) relatively easily (for example, JP-A-4-94273 laid-open on Mar. 26, 1992 and JP-A-4-135382 laid-open on May 8, 1992).

However, in a camera system using the solid-state CMOS imaging device, as shown in FIG. 5, it is ascertained that influence due to the flicker of the fluorescent lamp appears as light and dark spots in a striped pattern and the picture quality is deteriorated remarkably. The light and dark spots are produced as follows.

As shown in FIG. 4a, an amount of light of a fluorescent lamp is varied in accordance with twice as high as a frequency of a power supply, that is, a half of a period of the power supply. The frequency of the power supply is generally 50 or 60 Hz and the light amount is varied at the period of 10 milliseconds for 50 Hz and at the period of 8.3 milliseconds for 60 Hz.

The CMOS imaging device is also provided with an electronic shutter function for controlling the charge storage time for each pixel in each frame similarly to the solid-state CCD imaging device. However, start and end timings for storage of electric charges are set up so that storage of electric charges for all pixels in a frame is started and ended at the same timing simultaneously in the solid-state CCD imaging device, whereas storage control of electric charges are made so that the same charge storage time is given to all pixels but its timing is different for each pixel in the solid-state CMOS imaging device.

As described above, in the solid-state CCD imaging device, the electric charges photoelectrically converted and stored for each pixel are transferred simultaneously in parallel at the same timing for all pixels and then read out, while in the solid-state CMOS imaging device electric charges photoelectrically converted and stored for each pixel are successively selected for each pixel by a matrix selection circuit and read out. Accordingly, the charge storage timing of the pixel depends on the reading and selection timing by the matrix selection circuit. That is, the stored electric charges are read out at the selected and read timing by the matrix selection circuit. Accordingly, the charge storage timing for each pixel in the CMOSS type solid-state imaging device is different little by little in order of reading out the pixel.

For example, as shown in FIG. 4b, when the charge storage time for each pixel is T seconds (T<half period of a power supply) for one frame, electric charges for two pixels A and B are stored during the same T seconds while the start and end timings thereof are different for the pixels A and B. Accordingly, even when the charge storage times for the pixels A and B are the same, the stored light amounts (corresponding to areas hatched in FIG. 4B) from the start to the end of the storage of electric charges during the T seconds are different depending on variation in an amount of light of a fluorescent lamp.

Consequently, even when the charge storage time for each pixel is the same, the stored light amount for each pixel is varied and its variation is stored successively to produce light and dark spots (difference in brightness) in a frame. In the case of a video camera of a raster scanning system such as the NTSC, the density of horizontal scanning lines is varied periodically to produce light and dark spots in the form of belt. The light and dark spots produced in the frame are difficult to distinguish from contents of a picture and cannot be corrected by a conventional technique such as AGC.

Heretofore, in order to remove the above disadvantages, there is proposed a system in which a photodiode dedicated to detect flicker is provided within a solid-state CMOS imaging device and a mechanism for reading out a detection signal of the photodiode to judge it in synchronism with a vertical transfer clock differently from reading operation of a signal from a pixel in an picture outputting area is provided so that variation in brightness is sampled to thereby automatically judge the turning-on-and-off frequency of 100 or 120 Hz of the fluorescent lamp and cancel flicker (ISSCC 2001/Feb. 5, 2001, "DIGEST OF TECHNICAL PAPERS" pp. 90–91).

In the system for automatically judging the turning-on-and-off frequency of 100 or 120 Hz of the fluorescent lamp by means of the above method, however, the flicker detection area (photodiode) is provided within the imaging device and accordingly a chip size is increased. Further, since the signal processing circuit dedicated to process the detection signal from the photodiode is required, the chip size is further increased and an increased cost is avoided.

SUMMARY OF THE INVENTION

It is a first object of the present invention to provide flicker canceling technique capable of preventing light and dark spots appearing in a picture frame due to flicker of an illumination light source such as a fluorescent lamp in an imaging system such as a video camera using a solid-state CMOS imaging device effectively by means of relatively simple constituent means.

It is a second object of the present invention to provide technique capable of performing automatic iris adjustment widely and smoothly while preventing reduction of picture quality due to flicker of a light source effectively in an imaging system using a solid-state CMOS imaging device.

It is a third object of the present invention to provide technique capable of automatically judging whether flicker due to a fluorescent lamp is produced or not prior to canceling of the flicker in an imaging system using a solid-state CMOS imaging device without provision of dedicated measures such as a photodiode.

According to a first aspect of the present invention, an imaging system using a solid-state CMOS imaging device, comprising charge storage control means for setting up an electric charge storage time for each pixel to be equal to a turning-on-and-off period of a fluorescent lamp or an integral multiple thereof. Thus, flicker due to an illumination light source such as the fluorescent lamp appearing as light and dark spots in a frame can be prevented effectively by means of simple constituent means.

For example, when the turning-on-and-off period of the fluorescent lamp is T as shown in FIG. 10, (a) stored light amounts of pixels A, B, C and D of FIG. 8 are as shown at (b), (c), (d) and (e) of FIG. 10 for the electric charge storage time T, so that difference in the stored light amounts (corresponding to hatched areas of FIG. 10) of all pixels vanishes and since the stored light amount is equal to an area corresponding to one of changing waveforms showing variation in light amounts due to turning on and off of the fluorescent lamp, influence of flicker is not exerted. It is apparent from FIG. 10 that even when the charge storage time is set up to be an integral multiple of T, any difference is not produced in the stored light amounts of all pixels.

Further, in the above aspect, when the charge storage time is set up while using a horizontal scanning line as a unit, the function of the solid-state CMOS imaging device is utilized to make it possible to set up the charge storage time simply and exactly. Further, the charge storage time is changed over in response to the turning-on-and-off period of the light source illuminating the object to be imaged or the integral multiple thereof to set up the stored light amount for each pixel variably stepwise and difference in the stored light amounts between steps is interpolated by means of continuous gain control of read-out signals of pixels, so that automatic iris adjustment can be made widely and smoothly while preventing flicker due to an illumination light source such as a fluorescent lamp effectively. In this case, the gain control can be performed in any one or both of the inside and the outside of the solid-state CMOS imaging device.

Moreover, in the above case, for example, if it is judged that flicker is produced when the control of canceling flicker due to the fluorescent lamp operating at the power supply frequency of 50 Hz is being operated, a mode may be changed over to the control of canceling flicker due to the fluorescent lamp for the power frequency of 60 Hz.

According to a second aspect of the present invention, by paying attention to the fact that brightness is changed together with time in a pixel area having a width smaller than a half period of light and dark spots and an integrated value of brightness is not changed largely as far as the object to be imaged is not changed, in an angle-of-view area having a large area to the degree that difference in brightness of light and dark spots is smoothed, brightness in any place on a picture (hereinafter referred to as small-area brightness) and brightness in a large area on the picture (hereinafter referred to as large-area brightness) are detected by plural times to judge whether flicker due to the fluorescent lamp is produced or not on the basis of a changed rate of brightness.

Concretely, when change in the small-area brightness is large and change in the large-area brightness is small, it is judged that flicker is produced, while when change in the small-area brightness is large and change in the large-area brightness is large, when change in the small-area brightness is small and change in the large-area brightness is small, and when change in the small-area brightness is small and change in the large-area brightness is large, it is judged that flicker is not produced.

Further, only detection circuits for the small-area brightness and the large-area brightness are provided in a semiconductor integrated circuit for processing read-out signals of pixels and brightness levels detected by the detection circuits are sent to a microcomputer so that judgment as to whether flicker is produced or not on the basis of the brightness levels is performed by means of processing in accordance with a software of the microcomputer to thereby make it possible to suppress an increased circuit scale of the semiconductor integrated circuit for processing the read-out signals of the pixels and reduce a chip size.

The above and other objects and advantages of the present invention will become clear from the following description with reference to the accompanying drawings.

BRIEF DESCRIPTION OF THE DRAWINGS

FIG. 10 is a diagram showing waveforms representing a charge storage timing of pixels and a relation of a turning-on-and-off period of a fluorescent lamp and a stored light amount in the embodiment;

FIG. 11 is a block diagram schematically illustrating a second embodiment of a camera system using a solid-state CMOS imaging device to which the present invention is applied;

FIG. 14 is a flow chart showing an example of a judgment procedure of a brightness level in a small area of the second embodiment.

DESCRIPTION OF THE EMBODIMENTS (First Embodiment)

Figure 1:
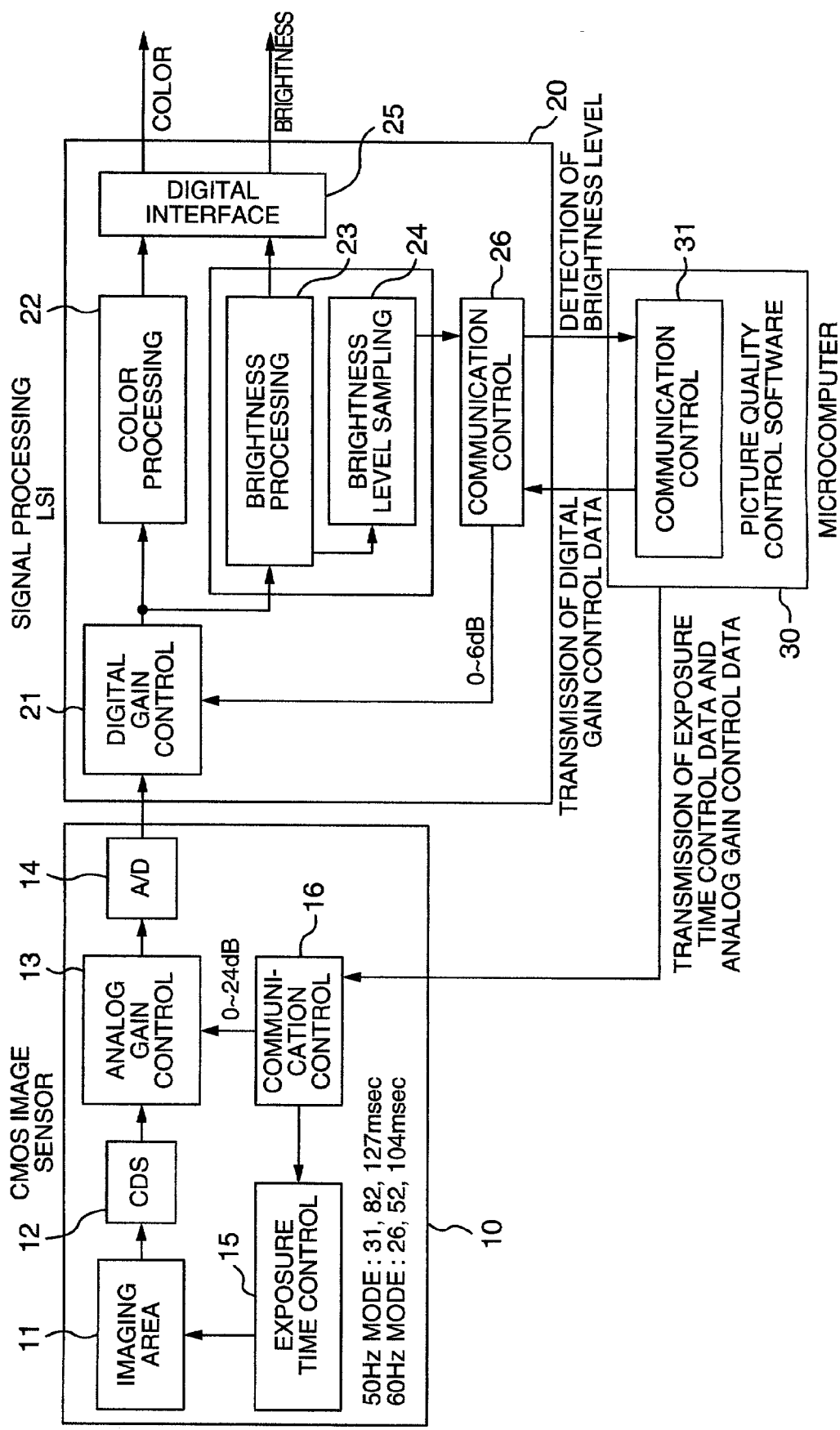
FIG. 1 is a block diagram schematically illustrating an embodiment of a camera system using a CMOSS type solid-state imaging device according to the present invention.

FIG. 1 is a block diagram schematically illustrating a first embodiment of a camera system using a solid-state CMOS imaging device to which the technique of the present invention is applied. The camera system shown in FIG. 1 includes a solid-state CMOS imaging device (image sensor) 10, a signal processing LSI 20 and a system controller 30 constituted by a single-chip microcomputer or the like.

The solid-state CMOS imaging device 10 includes an imaging area 11, a CDS circuit 12, an analog type gain control circuit 13, an A-D converter 14, a charge storage time control circuit 15 and a communication control unit 16, which are integrated on the same semiconductor substrate.

Figure 2:
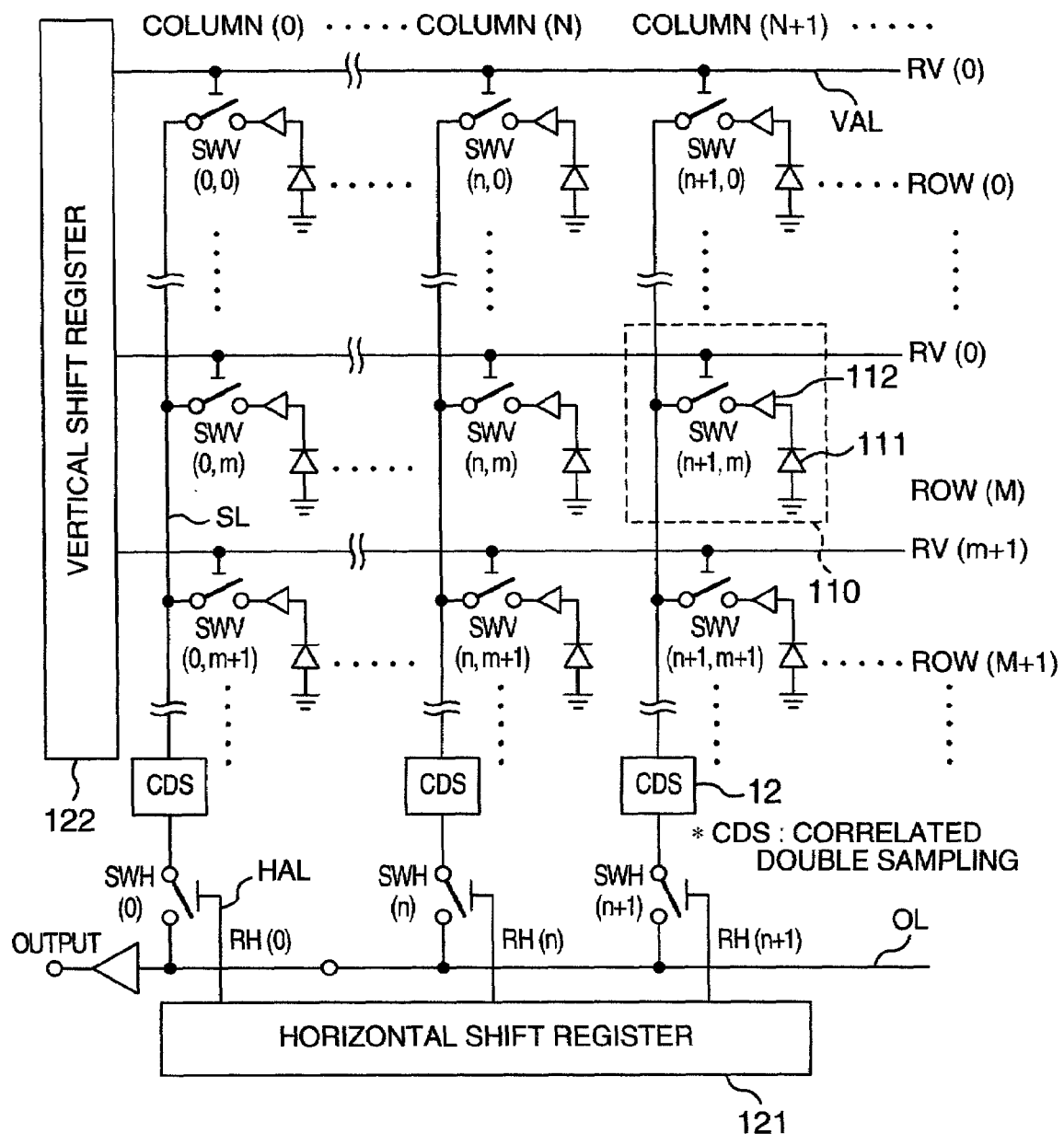
FIG. 2 is a circuit diagram illustrating partially a configuration of an imaging area of the solid-state CMOS imaging device.

As shown in FIG. 2, the imaging area 11 is formed of a large number of unit cells or pixels 110 arranged into a matrix having rows (horizontal) and columns (vertical). Each pixel 110 is composed of a photodiode 111, an amplifier 112 and a selection switch SWV and is selected one by one successively by means of a horizontal transfer circuit (horizontal shift register) 121 and a vertical transfer circuit (vertical shift register) 122 to be read out.

The CDS (Correlated Double Sampling) circuit 12 samples a signal read out from a selected pixel 110 while removing noise therefrom. The analog type gain control circuit 13 controls a transmission gain of the read-out signal of the pixel produced from the CDS circuit 12 in an analog manner. The A-D converter 14 converts the analog-controlled read-out signal of the pixel into a digital signal to be outputted. The charge storage time control circuit 15 controls an electric charge storage time of each pixel, that is, an electronic shutter time. The control of the charge storage time (exposure time) is made on the basis of a charge storage time setting signal supplied through the communication control unit 16 from the outside. The communication control unit 16 makes exchange of a control signal or a set signal between the system controller 30 and the communication control unit 16.

The signal processing LSI 20 includes a digital type gain control unit 21, a color signal processing unit 22, a brightness processing unit 23, a brightness level sampling unit, a digital interface (I/F) 25 and a communication control unit 26. The signal processing LSI 20 prepares a digital video signal (color signal and brightness signal) of television standards (NTSC standards) from the read-out signal of the pixel produced from the imaging device 10 to be outputted and makes exchange of a brightness level detection signal and digital gain control data between the system controller 30 and the signal processing LSI 20. The brightness level detection signal is prepared by sampling brightness of the read-out signal of the pixel inputted from the imaging device 10. The digital gain control data sets up a transmission gain of the digital read-out signal of the pixel inputted from the imaging device 10.

Figure 3A:
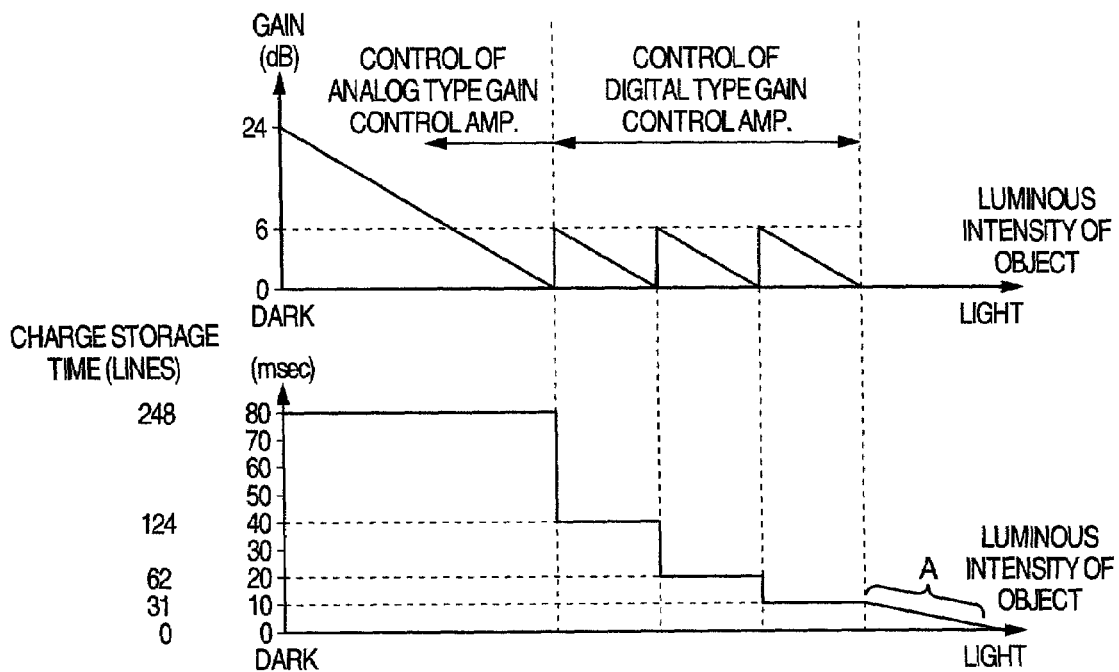
FIGS. 3a and 3b are graphs showing a relation of brightness of an object to be imaged and a charge storage time for explaining control of the charge storage time of a pixel in the camera system of the embodiment.
Figure 3B:
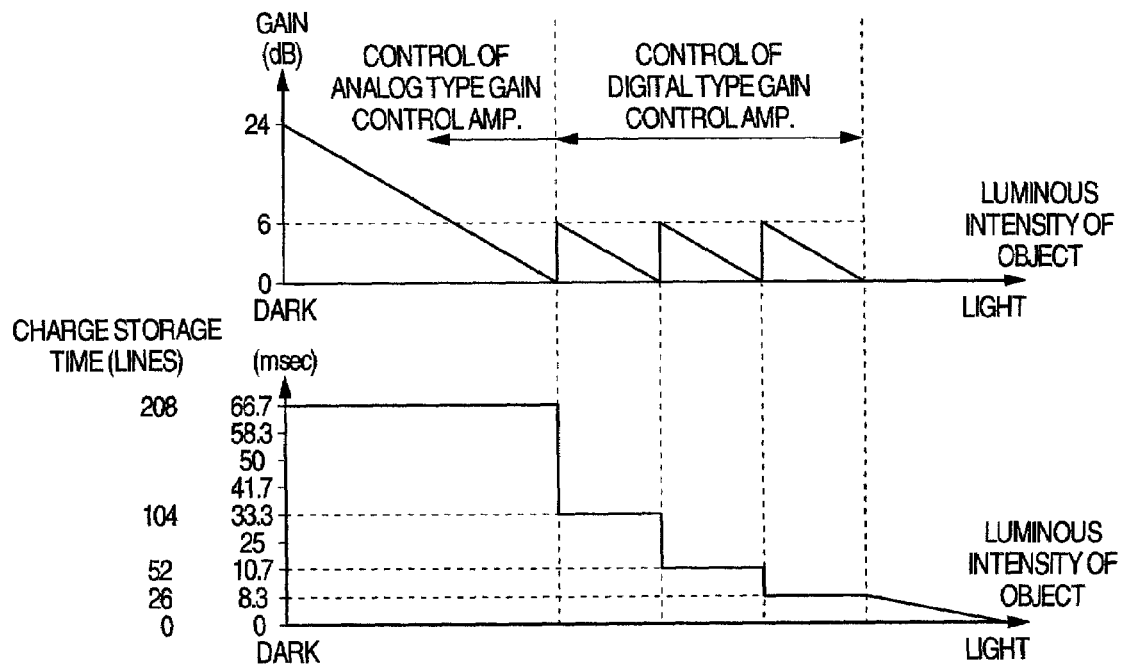

The system controller 30 is constituted by a microcomputer or the like and controls operation of the imaging device 10 and the signal processing LSI 20 through a communication control unit 31. The system controller 30 is provided with a picture quality control program for performing removal (cancel) of flicker of a fluorescent lamp, control of an amount of light stored and the like. FIGS. 3a and 3b are graphs showing operation of controlling storage of electric charges by means of a picture quality control program provided in the system controller 30.

The camera system of the embodiment includes a program for executing the following controls 1 and 2 in order to remove flicker of a fluorescent lamp produced in the solid-state CMOS imaging device 10.

Control 1: the charge storage time in each pixel 110 of the solid-state CMOS imaging device 10 is set up to be equal to the turning-on-and-off period T of the fluorescent lamp or to the period T multiplied by the n-th (n=1, 2, 3, . . . ) power of 2 (2T, 4T, 8T, . . . ).

Control 2: when automatic iris adjustment is made, the charge storage time is changed over at the step identical with the turning-on-and-off period of the fluorescent lamp or an integral multiple thereof to set up a stored light amount for each pixel variably stepwise and difference in the stored light amounts between steps is interpolated by continuous gain control of the read-out signal of the pixel.

In the control 1, the charge storage time is selected in accordance with the frequency of 50 or 60 Hz of the power supply for the fluorescent lamp. Since the turning-on-and-off period of the fluorescent lamp is 10 milliseconds when the frequency of the power supply is 50 Hz, the charge storage time is set up to be 10 milliseconds or 10 milliseconds multiplied by the n-th (n=1, 2, 3, . . . ) power of 2 (20, 40, 80 . . . ms). With such setting, even when start and end timings of storage of electric charges are varied anyway, the stored light amount of each pixel received by illumination of the fluorescent lamp is made equal. Consequently, flicker of the fluorescent lamp appearing as light and dark spots in the frame is removed.

In the solid-state CMOS imaging device 10, the charge storage time is designated externally. In the designation of the storage time, a vertical transfer driving pulse is utilized as a unit for simplification of a counter circuit. That is, the number of charge storage lines constituted by the horizontal scanning lines as a unit is designated externally to thereby set up the charge storage time for each pixel.

Although not limited particularly, the solid-state CMOS imaging device 10 of the embodiment is adapted to read out one pixel every four periods of a master clock. When the frequency of the master clock is 8 MHz and the number of pixels for one horizontal scanning line is 649, the charge storage time of 10 milliseconds is calculated to be 10 ms/(125 ns×649)=30.8 line in terms of the horizontal scanning line. That is, the number of charge storage lines is set up to 30.8 lines, so that the charge storage time for each pixel can be set up to 10 milliseconds. Accordingly, in the area where the frequency of the commercial AC power supply is 50 Hz, the charge storage time is set up to 30.8 lines or 30.8 lines multiplied by the n-th (n=1, 2, 3, . . . ) power of 2 to thereby make it possible to remove flicker due to the fluorescent lamp having the turning-on-and-off period of 10 milliseconds.

In the area where the frequency of the commercial AC power supply is 60 Hz, the turning-on-and-off period of the fluorescent lamp is 1/(60 Hz×2)=8.3 milliseconds. The number of charge storage lines corresponding to the on-and-off period of 8.3 milliseconds is 8.3 ms/(125 ns×4×649 pixels) =25.68 lines. Accordingly, in this case, the charge storage time is set up to 25.68 lines or 25.68 lines multiplied by the n-th (n=1, 2, 3, . . . ) power of 2 to thereby make it possible to remove flicker due to the fluorescent lamp having the on-and-off period of 8.3 milliseconds.

The set number of charge storage lines has a permissible width of some degree in removal of light and dark spots in the frame. For example, the number of charge storage lines in case of removing flicker due to the fluorescent lamp having the on-and-off period of 10 milliseconds is calculated to be 30.8 lines or 30.8 lines multiplied by the n-th (n=1, 2, 3, . . . ) power of 2, while even when the number is rounded to an integral value such as 31 lines or 31 lines multiplied by the n-th (n=1, 2, 3, . . . ) power of 2, light and dark spots in the frame can be removed actually. In this case, slight shift or deviation is produced between the on-and-off period and the charge storage time, while this slight deviation makes its appearance as moderate difference in brightness between frames and does not produce light and dark spots in the frame. The moderate difference in brightness between frames can be removed easily by means of a conventional technique such as AGC.

In the control 2, in order to remove flicker of the fluorescent lamp, it is necessary to set up the charge storage time to the on-and-off period of the fluorescent lamp or the integral multiple thereof. However, the stored light amount (the intensity of the read-out signal of the pixel) can be controlled only stepwise by using only the charge storage time. Accordingly, in the present invention, in order to make it possible to control the stored light amount continuously, control of the number of charge storage lines and gain control of the read-out signal of the pixel are combined to perform continuous exposure control.

In FIGS. 3a and 3b, when the frequency of the power supply is 50 Hz and the on-and-off period of the fluorescent lamp is 10 milliseconds, the digital type gain control unit 21 of the signal processing LSI 20 performs gain control of 0 to 6 dB to thereby control the stored light amount continuously when the luminous intensity of an object to be imaged is light and the number of charge storage lines is 31 to 124 lines. That is, when the number of charge storage lines is within a predetermined range, continuous gain control is performed in accordance with the luminous intensity of the object, while gain control is performed so that the gain of the digital type gain control unit 21 is changed twice (about 6 dB) in response to the timing that the number of charge storage lines is changed twice such as 31 lines to 62 lines, 62 lines to 124 lines and 124 lines to 248 lines.

The reason why the gain control is performed by the digital type gain control unit 21 is that when discrete gain control (sudden change of gain) in response to change of the number of charge storage lines is performed by an analog circuit, noise is apt to be produced. Further, the reason why the charge storage time is set up to a period obtained by multiplying, by the n-th (n=1, 2, 3, . . . ) power of 2, the on-and-off period of the fluorescent lamp instead of the integral multiple of the period is that when changing-over of the number of charge storage lines is made at a period obtained by multiplying, by the n-th (n=1, 2, 3, . . . ) power of 2,the on-and-off period of the fluorescent lamp, the gain control range by the digital type gain amplifier can be set up to the same gain width (6 dB) even in any step of the storage time (number of lines) as understood from FIGS. 3a and 3b, so that the performance of the digital type gain amplifier can be utilized at the maximum and the number of times of changing over the storage time (number of lines) can be reduced.

When the luminous intensity of the object to be imaged is dark and the number of charge storage line reaches 248 lines, the gain control in the digital type gain control unit 21 is stopped and the analog type gain control unit 13 of the CMOS type solid-stage imaging device 10 is adapted to perform gain control of 0 to 24 dB. This is made to ensure bit accuracy of digital signal processing in the signal processing LSI 20.

The case where the number of charge storage lines is made smaller than 31 lines is predicted as outdoor photographic surroundings where the luminous intensity of the object to be imaged is as high as 1000 luxes or more. In this case, it is not necessary to perform exposure control in consideration of the flicker phenomenon due to the fluorescent lamp. Accordingly, in this case, the gain control is not performed and the stored light amount is controlled only by increasing and reducing the number of charge storage lines continuously (portion shown by mark A in FIGS. 3a and 3b). Even when the frequency of the power supply is 60 Hz and the on-and-off period of the fluorescent lamp is 8.3 milliseconds, the same exposure control as described above is performed with the exception that the number of charge storage lines is slightly different.

More concretely, when the luminous intensity of the object to be imaged is light and the number of charge storage lines is 26 to 104 lines, gain control of 0 to 6 dB is performed by the digital type gain control unit 21 of the signal processing LSI 20 to thereby control the stored light amount continuously. That is, when the number of charge storage lines is within a predetermined range, continuous gain control is performed in accordance with the luminous intensity of the object, while gain control is performed so that the gain of the digital type gain control unit 21 is changed twice (about 6 dB) in response to the timing that the number of charge storage lines is changed twice such as 26 lines to 52 lines, 52 lines to 104 lines and 104 lines to 208 lines.

(Second Embodiment)

FIG. 11 is a block diagram schematically illustrating a second embodiment of a camera system using a solid-state CMOS imaging device to which the technique of the present invention is applied. The camera system shown in FIG. 11 includes, similarly to the first embodiment, the solid-state CMOS imaging device (image sensor) 10, the signal processing LSI 20 and the system controller 30, which can be mounted on a printed wiring board, for example, to be constituted as a module.

In this case, a lens can be mounted on a package of the solid-state CMOS imaging device 10 in corresponding manner to an imaging area to constitute a module. With constitution of the module, it is easy to incorporate the imaging function into a portable data terminal and a portable telephone such as a PDA (Personal Digital Assistants) and the apparatus can be constituted to be compact. Further, the signal processing circuit 20 and the system controller (single-chip microcomputer) 30 can be constituted into a single LSI.

In FIG. 11, the same circuits and elements as those of FIG. 1 are designated by the same reference numerals and repeated description thereof is omitted.

Figure 6:
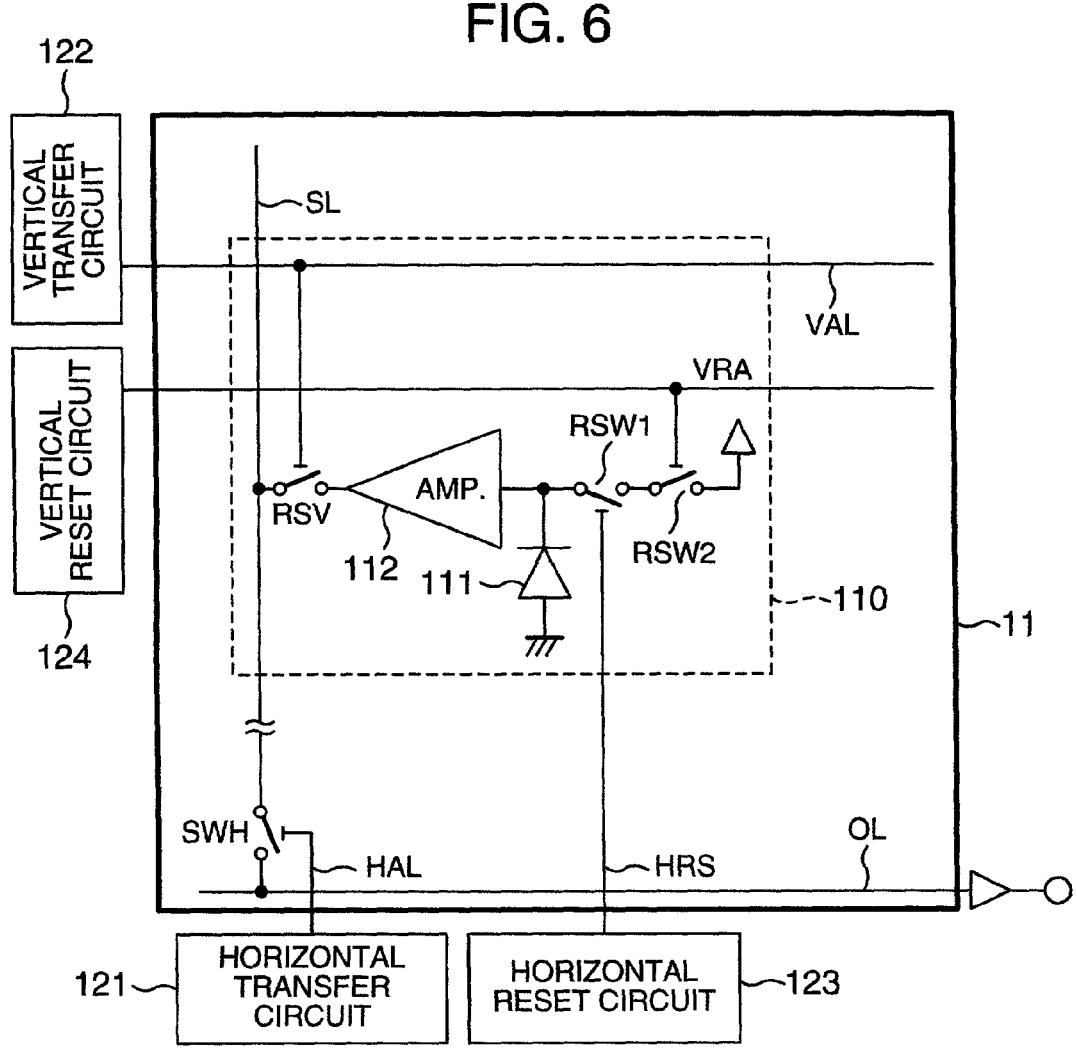
FIG. 6 is a circuit diagram illustrating an inner configuration of any one pixel of the solid-state CMOS imaging device.
Figure 7:
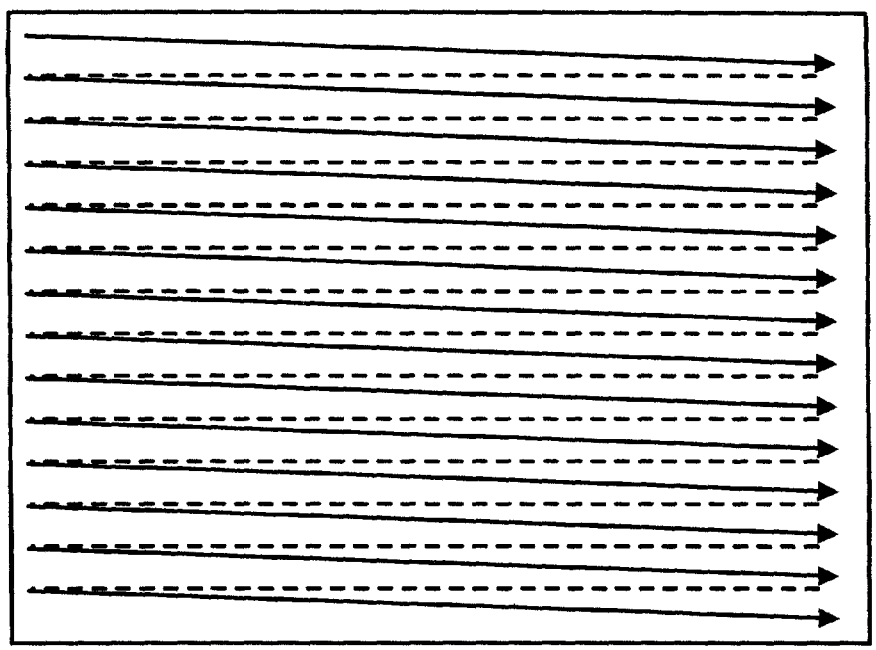
FIG. 7 is a diagram illustrating a reading order of pixel signals of the solid-state CMOS imaging device.

Each pixel of the solid-state CMOS imaging device 10 is constituted as shown in FIG. 6, which schematically illustrates in detail on enlarged scale one of pixels arranged into a matrix. In FIG. 11, numeral 110 denotes one of pixels arranged into a matrix, 111 a photodiode, and 112 an amplifier circuit for amplifying electric charges stored in the photodiode 111 to output it onto a signal line SL. A line (row) is first selected by a V address line VAL and a column is then selected by an H address line HAL. The signal read out onto the signal line SL is outputted through an output line OL. This operation is repeated successively to read out electric charges stored in all pixels of the imaging device.

When the reading is completed, electric charges stored in the photodiode 111 are discharged by reset switches RSW1 and RSW2 which are controlled to be turned on and off by reset signals HRS and VRS supplied from a horizontal reset circuit 123 and a vertical reset circuit 124. The period that the reset switches RSW1 and RSW2 are off is the charge storage time of the photodiode PD. The turning-on-and-off control of the reset switches RSW1 and RSW2 is made in synchronism with a vertical synchronizing signal and a horizontal synchronizing signal. Accordingly, a difference occurs between a charge storage start timing and a signal reading-out timing for each pixel.

Figure 8:
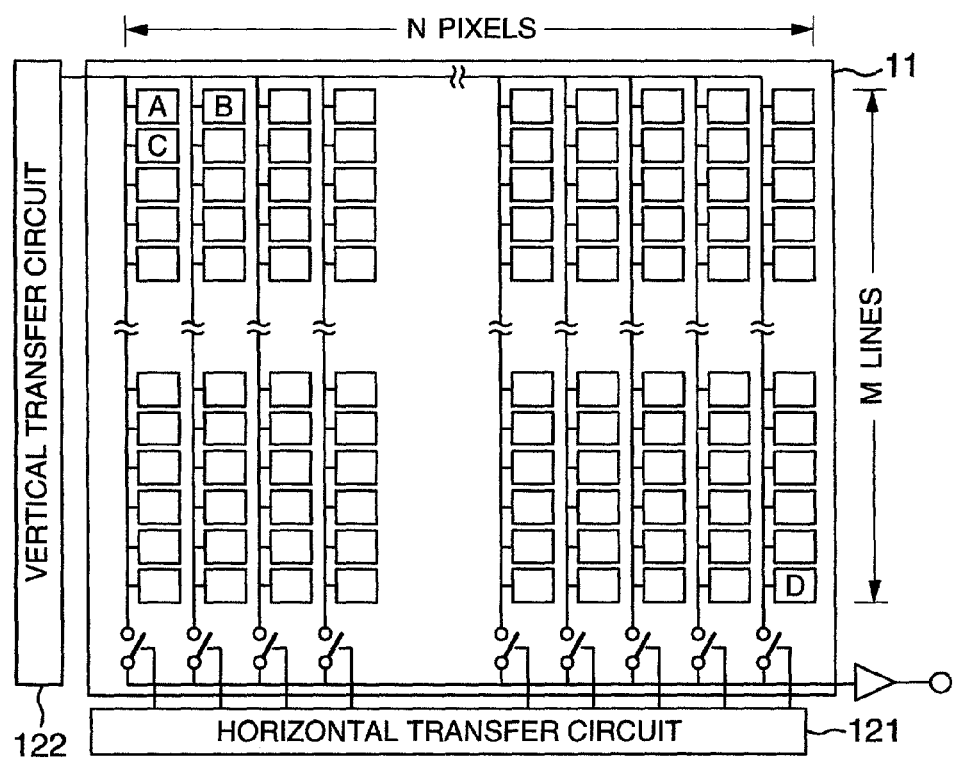
FIG. 8 is a schematic diagram illustrating an example of an arrangement of pixels in an imaging area of the solid-state CMOS imaging device.

In the image sensor of N pixels×M lines as shown in FIG. 8, a difference $\Delta t1$ of the reading-out time between pixels A and B disposed right and left to be adjacent to each other is given by $$\Delta t1 = 1/\text{horizontal transfer clock frequency} \quad (1)$$

A difference $\Delta t2$ of the reading-out time between pixels A and C disposed on lines adjacent on the upper and lower sides is given by $$\Delta t2 = 1/\text{vertical transfer clock frequency} \quad (2)$$

A difference $\Delta t3$ of the reading-out time between pixels A and D is given by $$\Delta t3 = \Delta t2 \times M - \Delta t1 \quad (3)$$

The reading-out time of a single picture is a period t from start of reading out of the pixel A to completion of reading out of the pixel D and is given by $$t = \Delta t2 \times M \quad (4)$$

The number of pictures produced for one second is named a frame rate and is expressed by unit of fps (frame per second). Since the frame period is t, the frame rate is given by $$\text{frame rate} = 1/t \text{ (fps)} \quad (5)$$

The solid-state CMOS imaging device is provided with the electronic shutter function for controlling the charge storage time of each pixel for one frame. However, the start and end timings for the charge storage are set up to perform the charge storage control so that the same storage time is given to all pixels in the solid-state CMOS imaging device, while the timing is different for each pixel.

As described above, in the solid-state CMOS imaging device, electric charges photoelectrically converted and stored for each pixel are successively selected for each pixel by the matrix selection circuit and read out. Accordingly, the charge storage timing of the pixel depends on the reading-out and selection timings by the matrix selection circuit. That is, electric charges which have been stored at the selection and reading-out time by the matrix selection circuit are read out. Accordingly, the charge storage start and end timings for each pixel in the solid-state CMOS imaging device are different little by little in order of reading out the pixel.

Figure 4A:
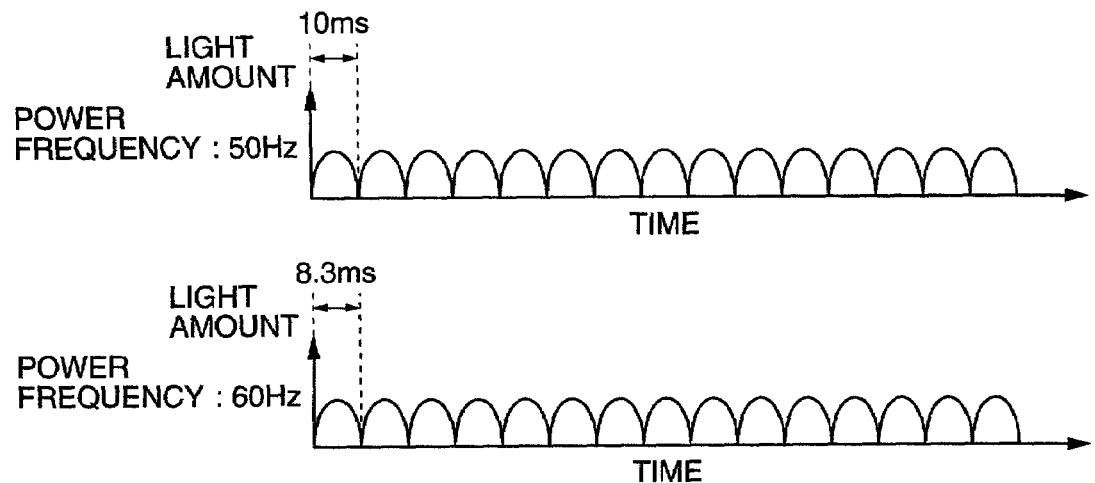
FIGS. 4a and 4b are diagrams showing waveforms representing a relation of a frequency of a power supply and a turning-on-and-off frequency of a fluorescent lamp and a relation of a turning-on-and-off waveform of the fluorescent lamp and a charge storage time of a pixel.
Figure 4B:
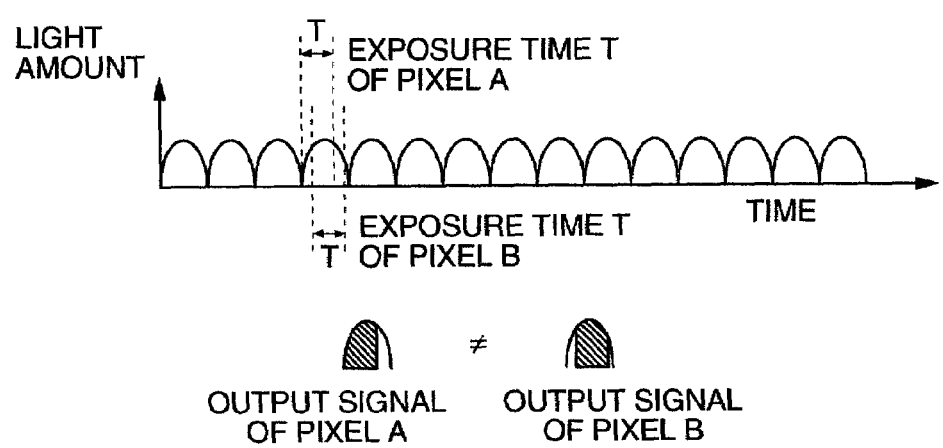
Figure 5:
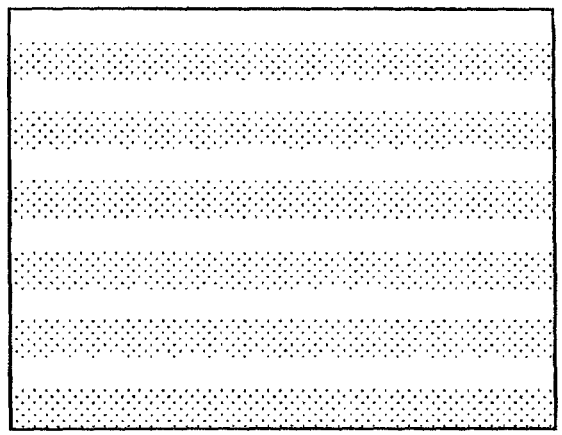
FIG. 5 illustrates flicker of a fluorescent lamp appearing on a monitoring screen.

For example, when the charge storage times for pixels A and B of FIG. 8 are both T seconds (T is shorter than a half period of the commercial power supply) in each frame, the two pixels A and B store electric charges for the same T seconds as shown in FIG. 4B, while the start and end timings of the charge storage are different by $\Delta t1$ between the pixels A and B as defined by the above equation (1). Accordingly, even when the charge storage times for the pixels A and B are the same, the stored light amount (corresponding to the hatched area of FIG. 4) from the start to the end of the storage time for T seconds is different due to change of the light amount when illumination is made by the fluorescent lamp.

Consequently, even when the charge storage time for each pixel is the same, the stored light amount for each pixel is varied and its variation is stored successively, so that light and dark spots (difference in brightness) are produced in the frame. In the case of a video camera of a raster scanning system such as NTSC, the density of the horizontal scanning lines is varied periodically to produce light and dark spots in the form of belt. The light and dark spots produced in the frame are difficult to distinguish from contents of a picture and cannot be corrected by the conventional technique such as AGC.

Further, flicker of the fluorescent lamp produced in the camera system using the solid-state CMOS imaging device seems as if light and dark spots (or difference in brightness) flow vertically when the turning-on-and-off period of the fluorescent lamp and the frame period of a picture are asynchronous.

Figure 9A:
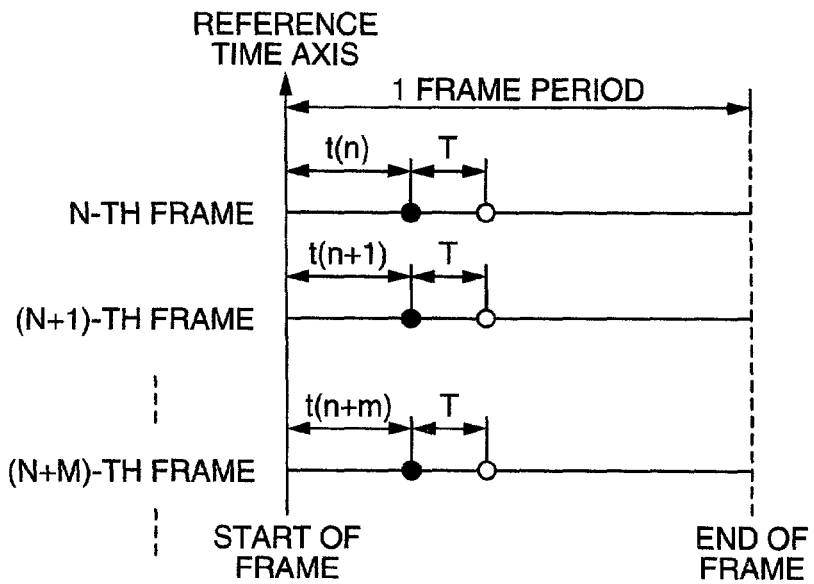
FIGS. 9a and 9b are timing charts showing a charge storage timing of pixels and a relation of a turning-on-and-off period of a fluorescent lamp and a stored light amount when the present invention is not applied.

The charge storage control is assumed to be made as the charge storage time=T seconds (≠ turning-on-and-off period of the fluorescent lamp), for example. Attention is paid to any one pixel X on the imaging device and change of the stored light amount of the pixel X in a frame unit is considered. FIG. 9a shows charge storage control timings of the pixel X when the reference time axis is a start point of each frame on the basis of operation of the imaging device.

The charge storage start timings t(n) and t(n+1) of the N-th and N+1st frames in the pixel X become equal, that is, t(n)=t(n+1).

The charge storage end timings (signal reading-out timings) t(n)+T and t(n+1)+T of the N-th and N+1st frames become also equal, that is, t(n)+T=t(n+1)+T and the N-th and the N+1st frames are coincident.

Figure 9B:
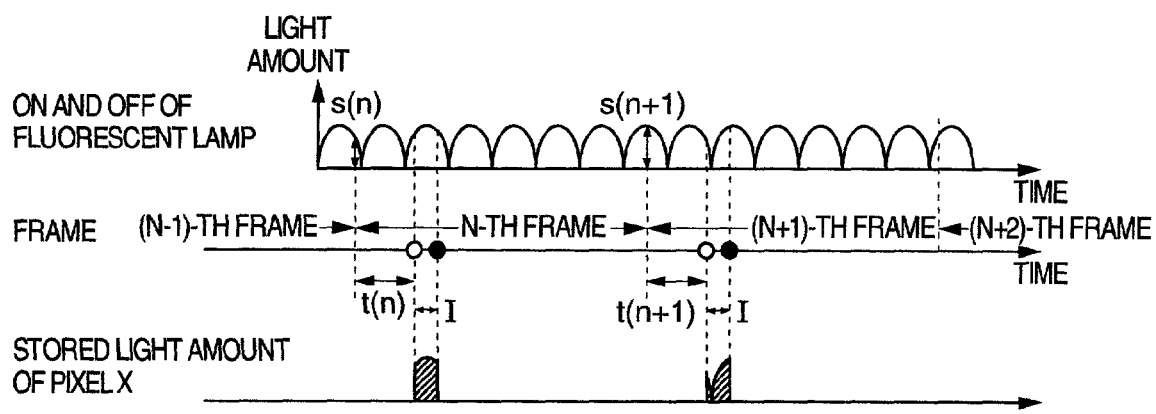

Operation is now considered on the basis of the turning on and off of the fluorescent lamp as shown in FIG. 9b.

When the turning-on-and-off period of the fluorescent lamp and the period of the frame are asynchronous, the light amount S(n) of the fluorescent lamp at the start point of the N-th frame is different from the light amount S(n+1) of that at the start point of the N+1st frame. Accordingly, the charge storage timing of the pixel X is asynchronous with the turning-on-and-off period of the fluorescent lamp.

Accordingly, in the pixel X, the charge storage timing and the storage time of the N-th frame are coincident with those of the N+1st frame, while a difference is produced between the stored light amounts as shown in FIG. 9b. This phenomenon appears not only for the pixel X but also for all the pixels on the imaging device similarly. Further, it is apparent that the difference is produced between the stored light amounts even in any frame (N+M). Such difference between the stored light amounts is produced successively in each picture outputting frame, so that it seems as if light and dark spots (or difference in brightness) flow vertically.

The flicker phenomenon of the fluorescent lamp is produced by the fact that the light amount of the fluorescent lamp is varied in accordance with twice the frequency of the power supply, that is, a half period of the power supply. Generally, the frequency of the power supply is 50 Hz or 60 Hz and the light amount is varied at the period of 10 milliseconds for 50 Hz and 8.3 milliseconds for 60 Hz as shown in FIG. 4a. Accordingly, when the charge storage timing of the pixel is set up in accordance with 50 Hz, light and dark spots are produced under the fluorescent lamp operating by the power supply of 60 Hz. This means that the charge storage timing of the pixel cannot be fixed.

Figure 12A:
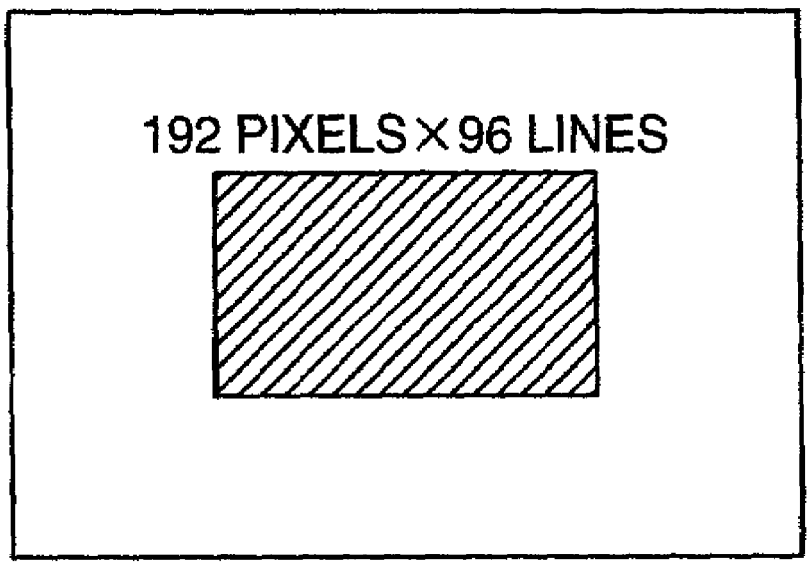
FIGS. 12a and 12b are diagrams showing an example of a detection area of a brightness level in the second embodiment.
Figure 12B:
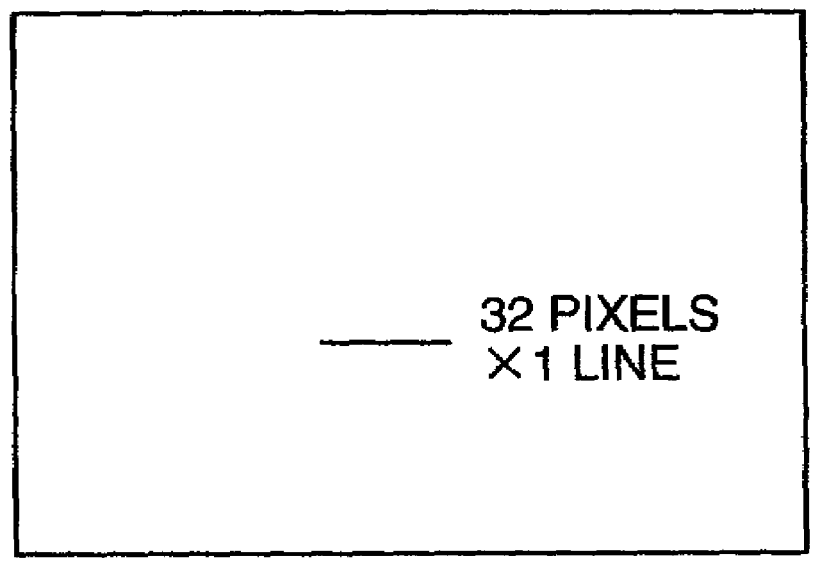

A camera system according to a second embodiment shown in FIG. 11 is configured to make it possible to judge whether flicker is produced by the fluorescent lamp of 50 Hz or 60 Hz and cancel it. The second embodiment is different from the first embodiment in that a large-area brightness level sampling unit 24a and a small-area brightness level sampling unit 24b are provided in the brightness level sampling unit 24 of the signal processing LSI 20. A large area defined by the large-area brightness level sampling unit 24a is a pixel area such as, for example, 192 pixels×96 lines as shown in FIG. 12a, in which difference in brightness by light and dark spots caused by flicker is approximately smoothed. On the other hand, a small area defined by the small-area brightness level sampling unit 24b is a pixel area such as, for example, 32 pixels×1 line as shown in FIG. 12b, having a width smaller than a half period of light and dark spots caused by flicker.

In the embodiment, the detection signals from the large-area brightness level sampling unit 24a and the small-area brightness level sampling unit 24b are supplied to the system controller 30. The system controller 30 automatically judges flicker of the fluorescent lamp for 50 Hz and 60 Hz on the basis of the detection signals, so that charge storage time control data and gain control data for the analog type gain control circuit 13 are supplied to the CMOS image sensor 10 and gain control data for the digital type gain control unit 21 is supplied to the signal processing LSI 20. This control procedure is now described with reference to the flow charts shown in FIGS. 13 and 14.

As described above, when the turning-on-and-off period of the fluorescent lamp and the frame period of the picture are asynchronous, it seems that light and dark spots (or difference in brightness) flow vertically. This phenomenon is utilized in the automatic flicker judgment of the embodiment. When it is assumed that a clock of 12 MHz is used as a master clock for the solid-state CMOS imaging device 10 in the camera system of the embodiment, the frame rate (the number of frames outputted for one second) is 15 fps and accordingly any deviation is not produced between the turning-on-and-off period of the fluorescent lamp and the frame period, so that light and dark spots on a picture are fixed in the area where the frequency of the commercial power supply is 60 Hz. In other words, since light and dark spots do not flow, the brightness of the small area in FIG. 12b is not changed even if flicker is produced.

Accordingly, the frame rate is set up to be 14.98 fps so that slight deviation occurs to cause light and dark spots on the picture to flow vertically. A crystal oscillation element (error is about one millionth) is used to generate the master clock for the solid-state CMOS imaging device 10, although not limited thereto.

In order to automatically judge 50 Hz or 60 Hz of flicker of the fluorescent lamp, the brightness level of the large area at the middle portion of the picture as shown in FIG. 12a is detected by the large-area brightness level sampling circuit 24a and the brightness level of the small area constituted by 32 pixels in one line on the picture as shown in FIG. 12b is detected by the small-area brightness level sampling circuit 24b so that the rate of changed brightness levels therebetween is judged to change over flicker canceling processing for 50 Hz and 60 Hz.

In the embodiment, measurements of the brightness in the areas by means of the large-area brightness level sampling circuit 24a and the small-area brightness level sampling circuit 24b are made. Then, a maximum value MAXL1 and a minimum value MINL1 for the large-area brightness detection data are decided from large-area brightness detection data RL1 to RL8 obtained from continuous 8 frames and a difference (MAXL1−MINL1) is calculated.

Thereafter, the same measurements are made for the continuous 8 frames similarly again and a maximum value MAXL2 and a minimum value MINL2 are decided from large-area brightness detection data RL9 to RL16. A difference (MAXL2−MINL2) is calculated.

Similarly, maximum values MAXS1, S2 and minimum values MINS1, S2 of the small-area brightness detection data are decided from small-area brightness detection data RS1 to RS8 and RS9 to RS16 obtained for continuous 8 frames and differences (MAXS1−MINS1) and (MAXS2−MINS2) are calculated.

Thereafter, the series of processing operation as described above is performed again after an interval of 20 frames. That is, judgment of brightness level is performed twice at the interval of 36 frames in total.

Figure 13:
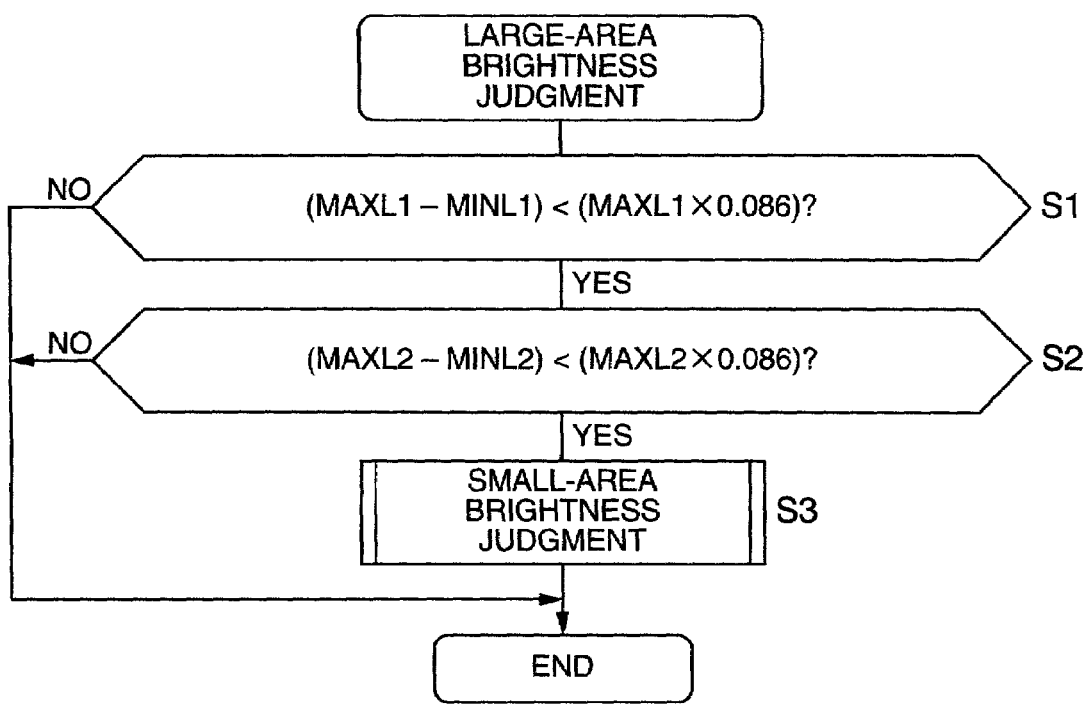
FIG. 13 is a flow chart showing an example of a judgment procedure of a brightness level in a large area of the second embodiment.

Subsequently, large-area brightness judgment processing as shown in FIG. 13 is performed on the basis of the measured results by the large-area brightness level sampling circuit 24a. In this processing, judgment 1 (step S1) as to whether the difference (MAXL1−MINL1) between the maximum value and the minimum value is smaller than 8.6% of the maximum value MAXL1 or not and judgment 2 (step S2) as to whether (MAXL2−MINL2) is smaller than 8.6% of the maximum value MAXL2 or not are performed.

If a prerequisite in any one of the judgments 1 and 2 is not satisfied, that is, when the difference is larger than 8.6%, it is judged that an object to be imaged is changed and 50/60 Hz mode for flicker cancel control is not changed over. If both prerequisites in the judgments of steps S1 and S2 are satisfied, that is, if the difference is smaller than 8.6%, small-area brightness judgment (FIG. 14) is performed (step S3).

In the small-area brightness judgment, the following judgments 3 and 4 are performed for the maximum values MAXS1 and MAXS2 (steps S31 and S32).

Brightness Level 25%<MAXS1<Brightness Level 125%   judgment 3

Brightness Level 25%<MAXS2<Brightness Level 125%   judgment 4

If any one of prerequisites in the judgments 3 and 4 is not satisfied, 50/60 Hz mode for flicker cancel control is not changed over. The brightness level 125% is a value at the time that a half of an maximum output of the analog type gain control circuit 13 is set up to 100% (maximum level is 200%).

If both prerequisites in the judgments 3 and 4 are satisfied, it is judged whether a difference between the maximum value MAXS1 and the minimum value MINS1 and a difference between the maximum value MAXS2 and the minimum value MINS2 are both larger than 8.6% and smaller than 25% or not (steps S33 and S34). If any one of prerequisites in the judgments is not satisfied, 50/60 Hz mode of flicker cancel control is not changed over. If the prerequisites in the judgments are satisfied, 50/60 Hz mode of flicker cancel control is changed over (step S35).

The constant values such as 8.6%, 25% and 125% in the judgments of the embodiment are set up on the basis of actually measured values of changed brightness upon occurrence of flicker and are different depending on an F value of a lens, sensitivity of an image sensor, a frame rate and the like.

In the brightness judgment processing of FIGS. 13 and 14 of the embodiment, the number of times of brightness detection, the judgment period, the judgment timing and the like can be modified freely to improve the accuracy all the more. Further, in the embodiment, the small area is defined to 32 pixels in one line and the large area is defined to 192 pixels×96 lines as shown in FIG. 12, while the sizes thereof may be set up freely from the outside (microcomputer). Moreover, in the embodiment, one small area is provided in one picture, while a plurality of small areas may be provided in one picture.

The flicker cancel control in the embodiment is the same as that of the first embodiment. Although not limited, the frequency of the master clock is 12 MHz and one pixel is read out at the intervals of 6 periods of the master clock in the solid-state CMOS imaging device of the embodiment. Accordingly, when the number of pixels for one horizontal scanning line is 447, the charge storage time of 10 milliseconds is converted to 44.7 horizontal scanning lines, that is, 10 ms/(83.3 ns×6×447)=44.7 lines. In other words, the number of charge storage lines is set up to 44.7 lines to thereby make it possible to set up the charge storage time for each pixel to 10 milliseconds. Accordingly, in the area where the frequency of the commercial AC power supply is 50 Hz, the charge storage time is set up to 44.7 lines or 44.7 lines multiplied by the n-th (n=1, 2, 3, . . . ) power of 2 to make it possible to remove flicker due to the fluorescent lamp having the turning-on-and-off period of 10 milliseconds.

Further, when the luminous intensity of an object to be imaged is light and the number of charge storage lines is 45 to 90 lines, gain control of 0 to 6 dB is performed by the digital type gain control unit 21 of the signal processing LSI 20 to thereby control the stored light amount continuously. That is, continuous gain control is performed in accordance with the luminous intensity of the object when the number of charge storage lines is within a predetermined range, while gain control is performed so that the gain is changed twice (about 6 dB) in response to the timing that the number of charge storage lines is changed twice such as 45 lines to 90 lines, and 90 lines to 180 lines.

In the area where the frequency of the commercial AC power supply is 60 Hz, the turning-on-and-off period of the fluorescent lamp is 1/(60 Hz×2)=8.3 milliseconds. The number of charge storage lines corresponding to the turning-on-and-off period of 8.3 milliseconds is 8.3 ms/(83.3 ns×6×447 pixels)=37.3 lines. Accordingly, in this case, the charge storage time is set up to 37.38 lines or 37.38 lines multiplied by the n-th (n=1, 2, 3, . . . ) power of 2 to thereby make it possible to remove flicker due to the fluorescent lamp having the turning-on-and-off period of 8.3 milliseconds.

When the luminous intensity of the object is light and the number of charge storage lines is 37 to 148 lines, gain control of 0 to 6 dB is performed by the digital type gain control unit 21 of the signal processing LSI 20 to thereby control the stored light amount continuously. That is, continuous gain control is performed in accordance with the luminous intensity of the object when the number of charge storage lines is within a predetermined range, while gain control is performed so that the gain is changed twice (about 6 dB) in response to the timing that the number of charge storage lines is changed twice such as 37 lines to 74 lines, and 74 lines to 148 lines.

The set number of charge storage lines has a permissible width of some degree in removal of light and dark spots in the frame. For example, the number of charge storage lines in case of removing flicker due to the fluorescent lamp having the on-and-off period of 10 milliseconds is calculated to be 44.7 lines or 44.7 lines multiplied by the n-th (n=1, 2, 3, . . . ) power of 2, while even when the number is rounded to an integral value such as 45 lines or 45 lines multiplied by the n-th (n=1, 2, 3, . . . ) power of 2, light and dark spots in the frame can be removed.

The invention made by the inventor has been described concretely with reference to the embodiments, while it is needless to say that the present invention is not limited to the embodiments and various changes and modifications may be made in the invention without departing from the spirit and the scope thereof. For example, in the embodiment, the analog type gain control circuit is provided in the solid-state CMOS imaging device 10 and the digital type gain control circuit is provided in the signal processing LSI 20 to perform the gain control of the read-out signal of the pixel, while the gain control of the read-out signal of the pixel may be performed by only any one of the imaging device 10 or the signal processing LSI 20. Further, in the embodiment, changing-over from the digital gain control to the analog gain control is performed at the same time as changing-over of the line number, while amplification is made by the digital type gain control circuit until 6 dB after changing over of the line number and thereafter it may be changed over to the analog type gain control circuit.

In the foregoing description, the invention made by the inventor is applied to the video camera, the invention is not limited thereto and can be applied to even a digital still camera for taking a photograph of a stationary object, for example. Further, the invention can be naturally applied to even removal of flicker caused by periodical turning-on-and-off operation of a light source illuminating an object except the fluorescent lamp.

According to described embodiments of the present invention, in the imaging system using the solid-state CMOS imaging device, the provision of the charge storage control means for setting up the charge storage time for each pixel to be the turning-on-and-off period of the light source illuminating the object or the integral multiple thereof can prevent flicker due to the illumination light source such as the fluorescent lamp appearing as light and dark spots in the frame by means of simple constituent means.

Further, in the imaging system using the solid-state CMOS imaging device, the charge storage time is changed over at the same step as the turning-on-and-off period of the light source illuminating the object or at the step equal to the integral multiple thereof to set up the stored light amount for each pixel variably stepwise and difference of the stored light amount between steps is interpolated by continuous gain control of the read-out signal of the pixel, so that automatic iris adjustment can be made widely and smoothly while preventing flicker due to the illumination light source such as the fluorescent light effectively.

Moreover, in the imaging system using the solid-state CMOS imaging device, since there is provided means for detecting variations in brightness in the small and large areas set in one frame, turning-on-and-off of the illumination light source can be judged while distinguishing from change in photographic surroundings of the object clearly. Consequently, the flicker canceling processing can be made exactly to thereby prevent reduction of the picture quality.

It should be further understood by those skilled in the art that the foregoing description has been made on embodiments of the invention and that various changes and modifications may be made in the invention without departing from the spirit of the invention and the scope of the appended claims.

What is claimed is:

1. An imaging system including a solid-state CMOS imaging device and a signal processing semiconductor integrated circuit for processing read-out signals of pixels from said solid-state CMOS imaging device, comprising:
   first level detection means for detecting brightness on a first area set up on an imaging area of said solid-state CMOS imaging device, said first area comprising a pixel area having a width smaller than a half interval width of a brightness difference shaped in strips on the imaging area caused by flicker;
   second level detection means for detecting brightness on a second area larger than said first area, said second area comprising a pixel area in which said brightness difference caused by flicker is substantially smoothed;
   judgment means for judging turning-on-and-off of a light source illuminating an object to be imaged on the basis of detection levels of said first and second level detection means; and
   a control unit for setting up an intensity of a read-out signal for each pixel of said solid-state CMOS imaging device by means of processing in accordance with a program which controls both a transmission gain of said read-out signal of each pixel and a number of charge storage lines constituted by horizontal scanning lines as a unit,
   wherein said judgment of the turning-on-and-off of said light source illuminating in accordance with the object on the basis of the detection levels of said first and second level detection means is performed by processing in accordance with the program in said control unit which judges whether a difference between maximum brightness values and minimum brightness values of the second area over a predetermined number of frames remain less than a predetermined value, and whether maximum brightness values and minimum brightness values of the first area over a predetermined number of frames satisfy a predetermined relation.

2. An imaging system including a solid-state CMOS imaging device and a signal processing semiconductor integrated circuit for processing read-out signals of pixels from said solid-state CMOS imaging device, comprising:
   first level detection means which detects brightness on a first area set up on an imaging area of said solid-state CMOS imaging device, the first area which is a predetermined area in a frame, said first area comprising a pixel area having a width smaller than a half interval width of a brightness difference shaped in strips on the imaging area caused by flicker;
   second level detection means which detects brightness on a second area which is set up on an imaging area of said solid-state CMOS imaging device, and is larger than said first area, the second area which is a predetermined area in the frame, said second area comprising a pixel area in which said brightness difference caused by flicker is substantially smoothed;
   judgment means which judges turning-on-and-off of a light source illuminating in accordance with an object to be imaged on the basis of detection levels of said first and second level detection means; and
   a control unit for setting up an intensity of a read-out signal for each pixel of said solid-state CMOS imaging device by means of processing in accordance with a program which controls both a transmission gain of said read-out signal of each pixel and a number of charge storage lines constituted by horizontal scanning lines as a unit,
   wherein said judgment of the turning-on-and-off of said light source illuminating in accordance with the object on the basis of the detection levels of said first and second level detection means is performed by processing in accordance with the program in said control unit which judges whether a difference between maximum brightness values and minimum brightness values of the second area over a predetermined number of frames remain less than a predetermined value, and whether maximum brightness values and minimum brightness values of the first area over a predetermined number of frames satisfy a predetermined relation.

* * * * *